United States Patent [19]

Nightingale

[11] Patent Number: 4,463,903

[45] Date of Patent: Aug. 7, 1984

[54] TURBOMACHINE EJECTOR NOZZLE

[75] Inventor: Douglas J. Nightingale, Atlanta, Ga.

[73] Assignee: Rolls-Royce Inc., New York, N.Y.

[21] Appl. No.: 376,506

[22] Filed: May 10, 1982

[51] Int. Cl.³ .......................... F02K 1/12; F02K 1/09; F02K 1/28

[52] U.S. Cl. .......................... 239/265.17; 239/265.25; 239/265.39

[58] Field of Search ...................... 239/265.17, 265.19, 239/265.25, 265.29, 265.33, 265.37, 265.41; 60/226.1, 226.2, 229, 271; 244/12.5, 23 D

[56] References Cited

U.S. PATENT DOCUMENTS 3,747,855  7/1973  Vdoviak et al. ........... 239/265.41 X
4,203,286  5/1980  Warburton ................. 239/265.17 X Primary Examiner—Andres Kashnikow Attorney, Agent, or Firm—Cushman, Darby & Cushman

[57] ABSTRACT

A variable geometry ejector nozzle for a gas turbine aero engine, in which a primary nozzle and convergent throat is defined by a pair of mutually confronting flaps 30 which are of corrugated form and have slots in them, and a pair of corrugated fairing flaps 33. The fairing flaps 33 are mounted on pivotal links 31 which also carry a pair of flaps 32 that define part of the downstream boundary of the nozzle flow path. A pair of outer flaps 35 interconnect the upstream ends to the flaps 33 to the downstream ends of the flaps 32. To define an ejector nozzle, the flaps 30 are rotated to define in appropriate area throat and the flaps 32,33 and 35 are swung bodily outward to form an air intake scoop 38. The flaps 30 and 33 can be rotated to a position where they form a thrust reverser to deflect gases flowing through the nozzle out through outlets 29.

8 Claims, 12 Drawing Figures

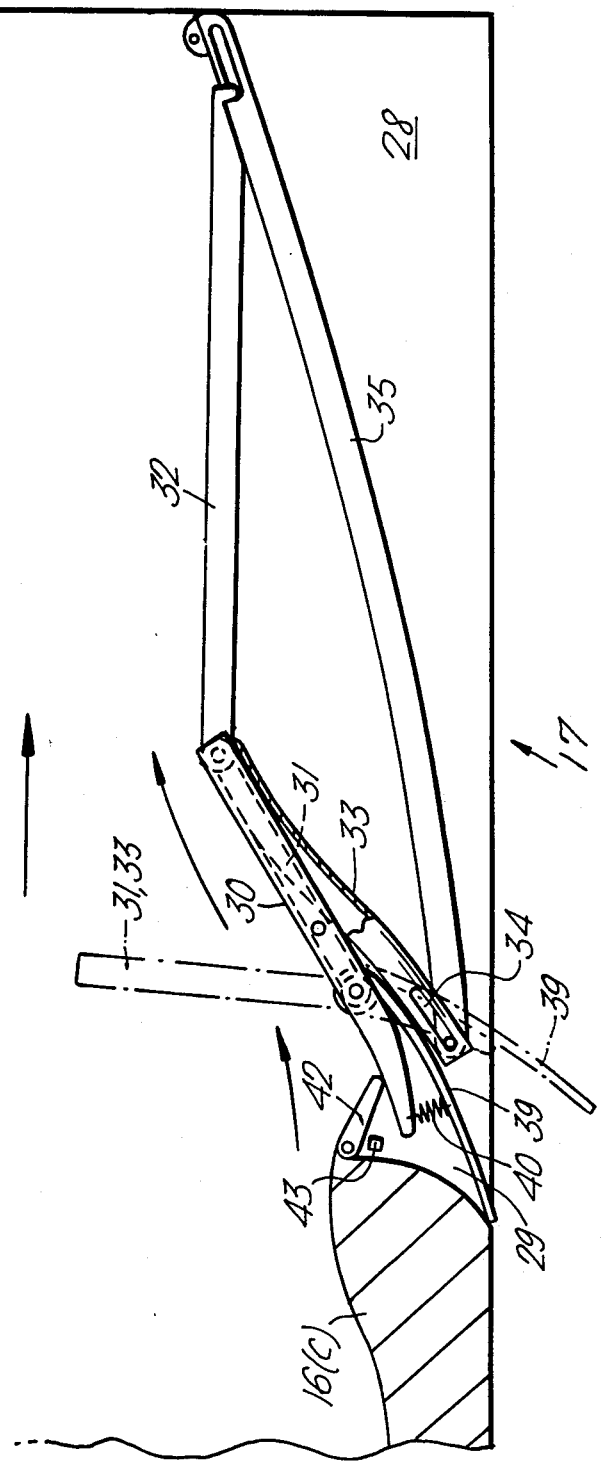

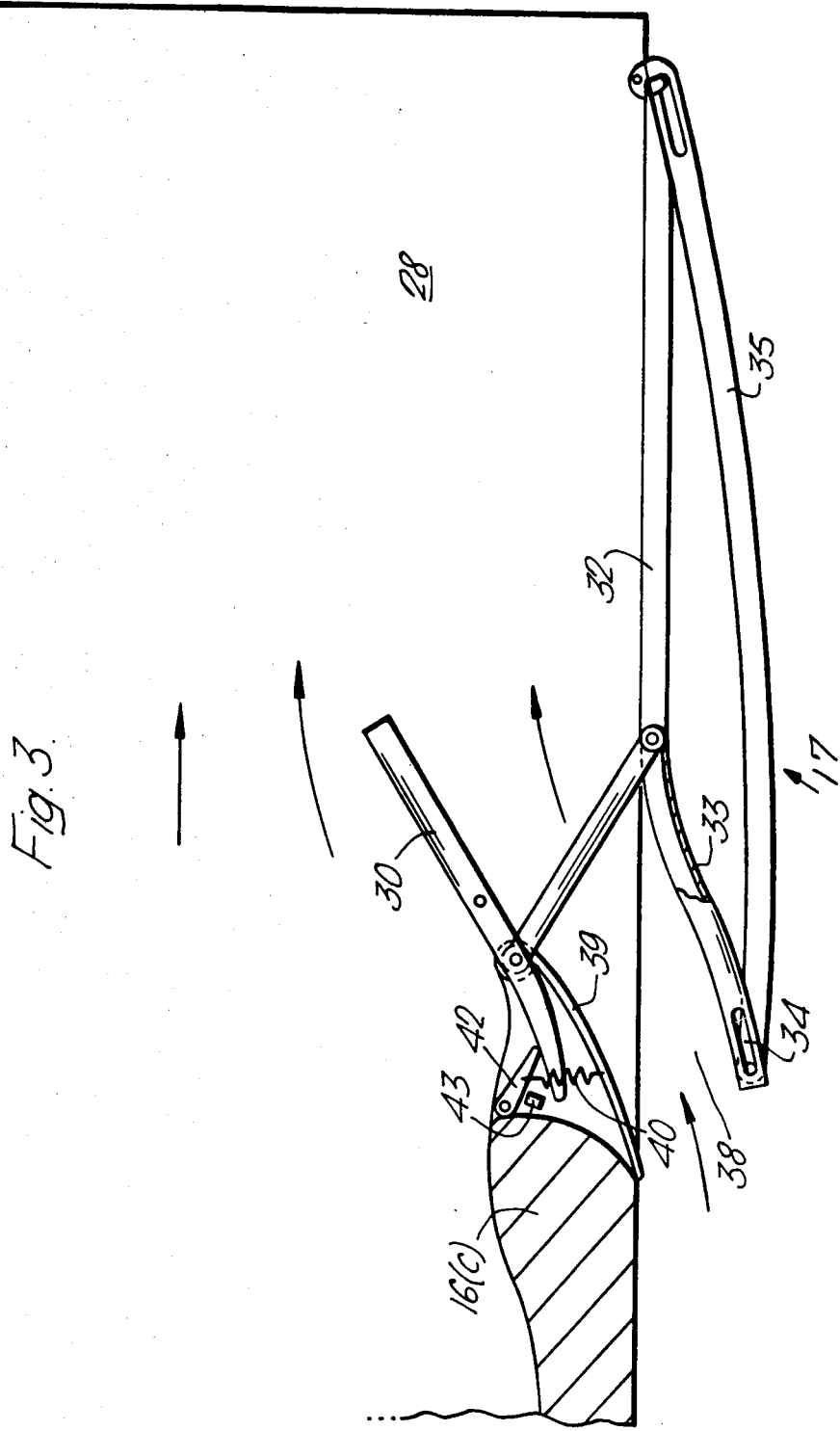

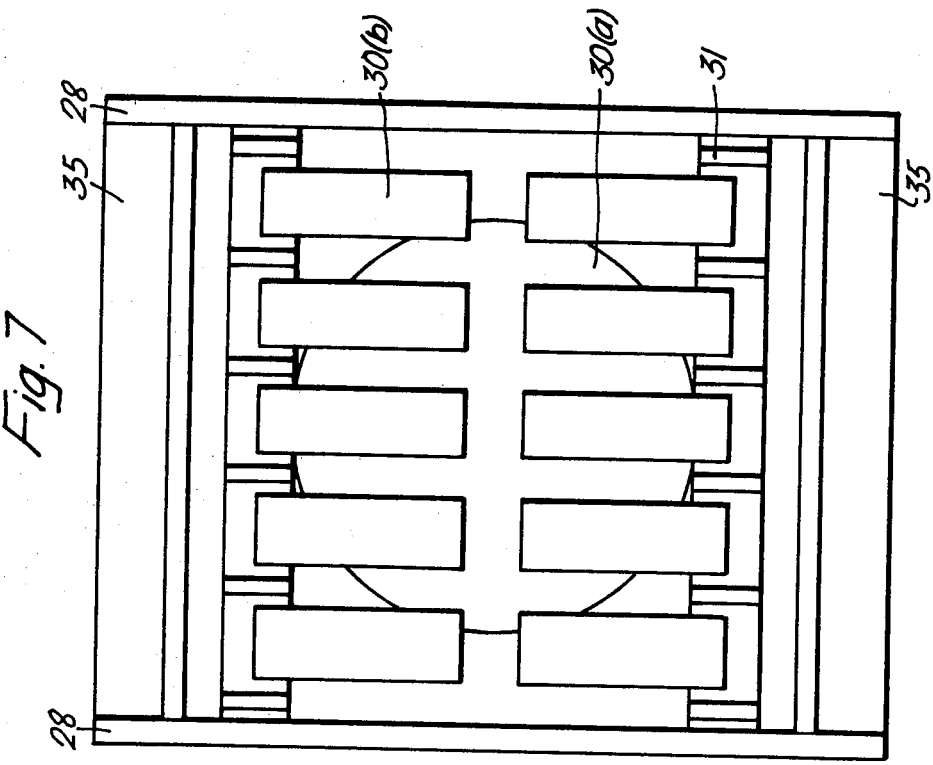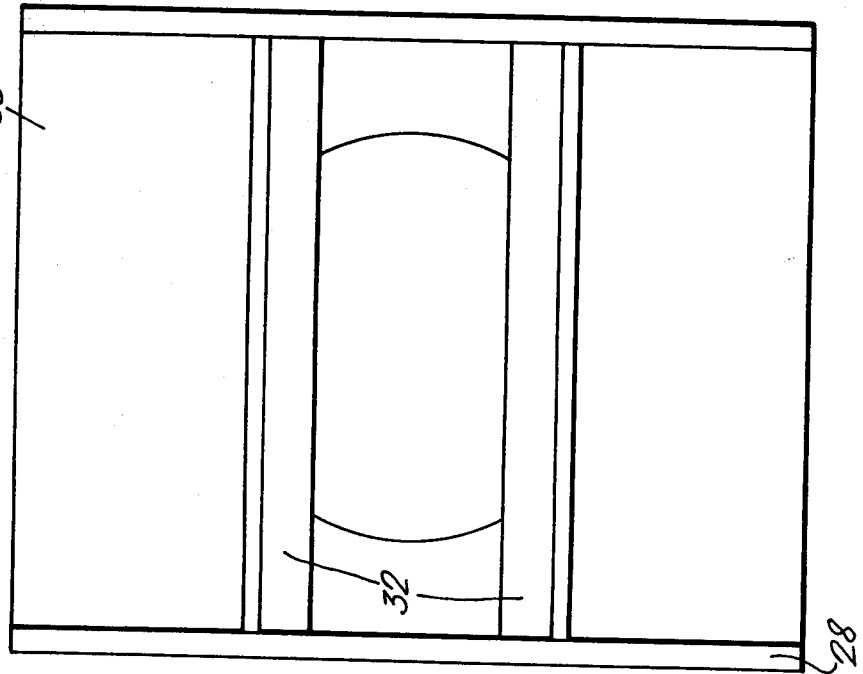

TURBOMACHINE EJECTOR NOZZLE

This invention relates to nozzles for gas turbine aero-engines and is particularly concerned with variable geometry nozzles and the suppression of the infra red radiation emitted by the hot exhaust plume of such engines.

Modern combat aircraft require the flexibility of being able to fly at subsonic or supersonic speeds and to perform a variety of roles. In some roles it is necessary to augment the basic thrust produced by the engine in the "dry" mode by burning additional fuel downstream of the engine's turbines, utilizing the unburnt oxygen in the exhaust gases to support combustion. This mode is known as reheat or afterburning. During re-heat it is necessary to increase the area of the nozzle to accommodate the increased volume of gases so as not to impair the efficient functioning of the engine. In other roles such as supersonic cruise, it is desirable to vary the geometry of the exhaust nozzle of the engine from a convergent geometry for subsonic speed to a configuration having an increased area throat (compared to that required during the "dry" mode or at subsonic cruise) formed between a convergent and divergent part of the nozzle—often referred to as a con-di nozzle.

There are times during the flight envelope of an aircraft when re-heat is not required and when the prime requisite is to reduce the infra red emission of the exhaust plume and thereby reduce or avoid detection by heat seeking missiles directed towards the aircraft. These missiles usually detect the infra-red radiation of the hot exhaust gas plume and once the plume is located home in on the hot parts of the engine to destroy the aircraft.

There is a need for a nozzle design that not only caters for dry and reheat modes of operation, but also enables one selectively to reduce the infra-red emission of the engine.

An object of the present invention is to provide a variable geometry nozzle which is capable of use both in the dry and reheat modes of operation and also capable of reducing the infra-red emission of the hot exhaust gas plume.

The invention as claimed enables one to vary the geometry of the nozzle to cope with dry and reheat modes of operation by moving the flaps and enables one to reduce the infra-red emission by opening additional air inlets which admit ambient air to cool and shield the hot exhaust plume.

The nozzle of the present invention may be installed on a fixed jet pipe or on a vectorable jet pipe. Furthermore, the nozzle of the present invention may be installed on the vectorable front nozzles of an engine such as the Rolls-Royce Limited Pegasus engine which discharge cold or reheated by-pass air.

The invention will now be described, by way of an example, with reference to the accompanying drawings in which:

FIGS. 2 to 4 illustrate in more detail a sectional elevation of part of the rear nozzle of the engine shown in FIG. 1 and shows three various configurations of nozzle that can be obtained with the present invention.

FIG. 6 is an end view of the said nozzle when in the particular configuration shown in FIG. 2, while FIG. 7 is an end view of the said nozzle when in the configuration shown in FIG. 3.

Figure 8:
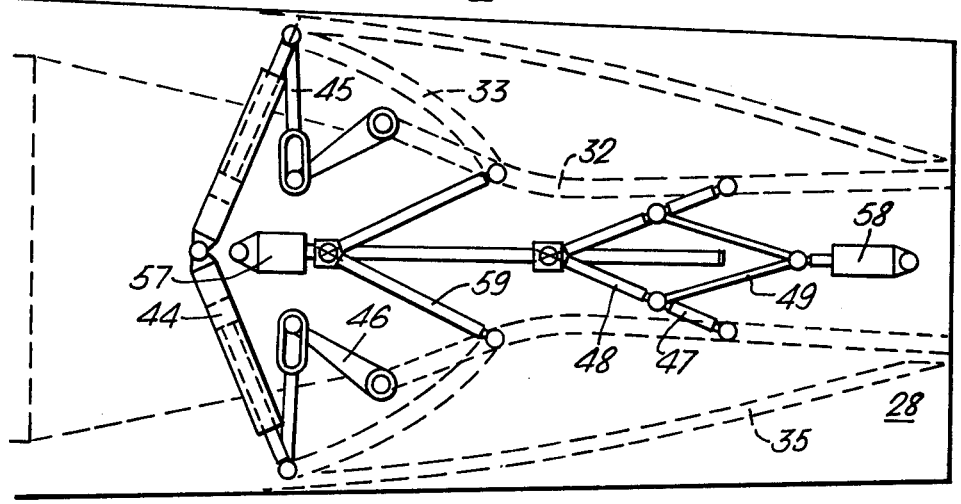
Figure 9:
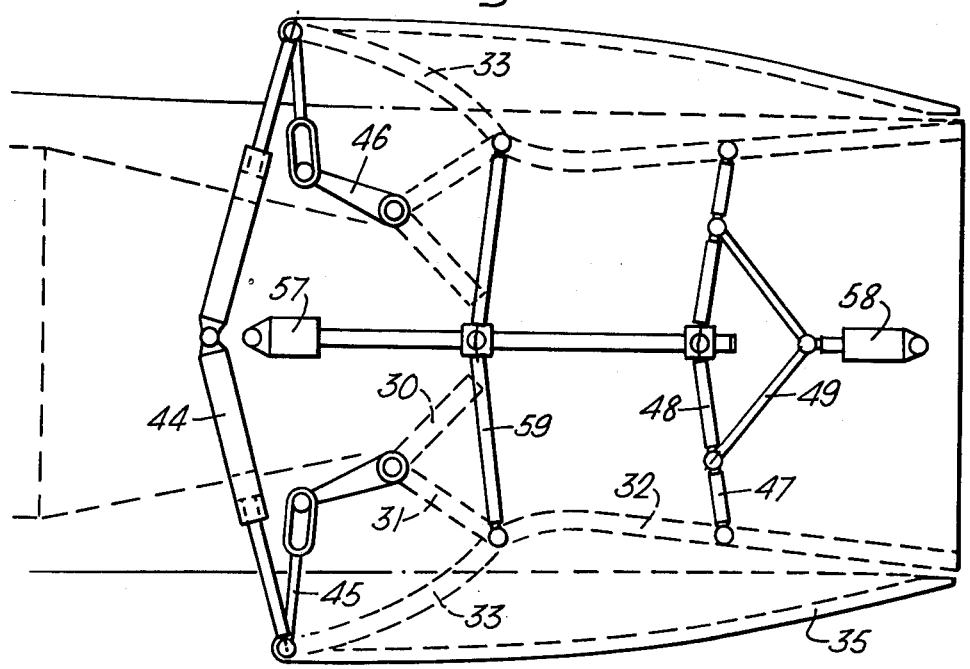

A typical arrangement of actuators housed within the sidewalls of the said nozzle is illustrated in FIGS. 8 and 9.

FIG. 8 shows the actuators when the nozzle is in the configuration shown in FIG. 2, while FIG. 9 shows the actuators when the nozzle is in the configuration shown in FIG. 3.

Figure 10:
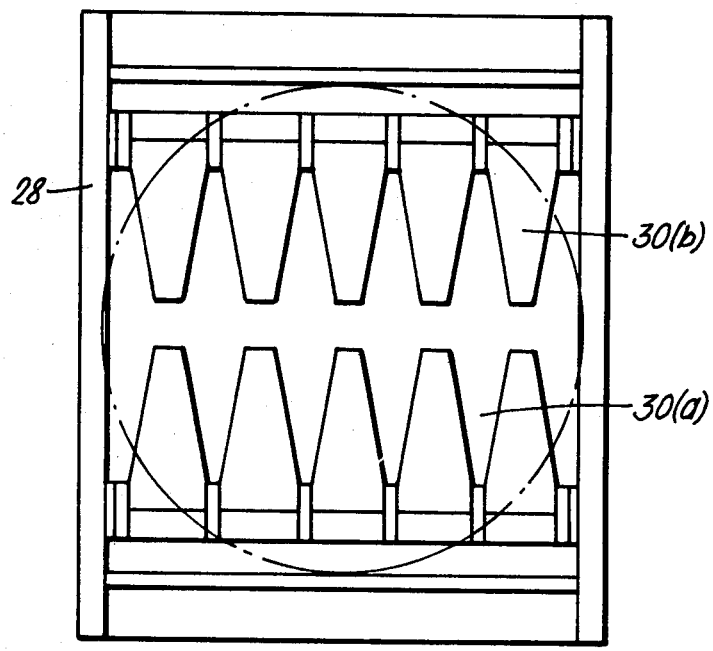

FIG. 10 illustrates an end view of the said nozzle when in the configuration shown in FIG. 3 and differs from FIG. 7 in that the flaps 30 are tapered.

Figure 11:
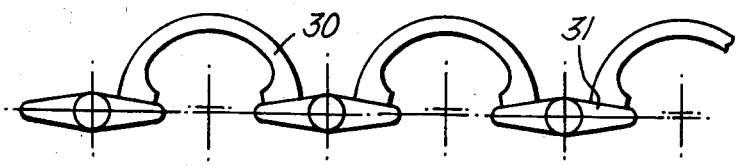
Figure 12:
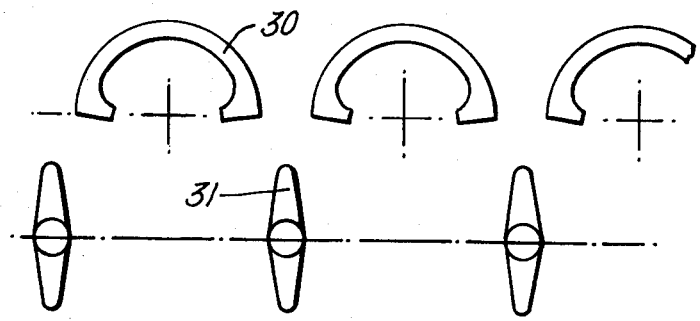

FIGS. 11 and 12 illustrate a cross-sectional view through the flaps 30 and links 31 of the said nozzle when in the configurations shown in FIGS. 2 and 3, respectively.

Figure 1:
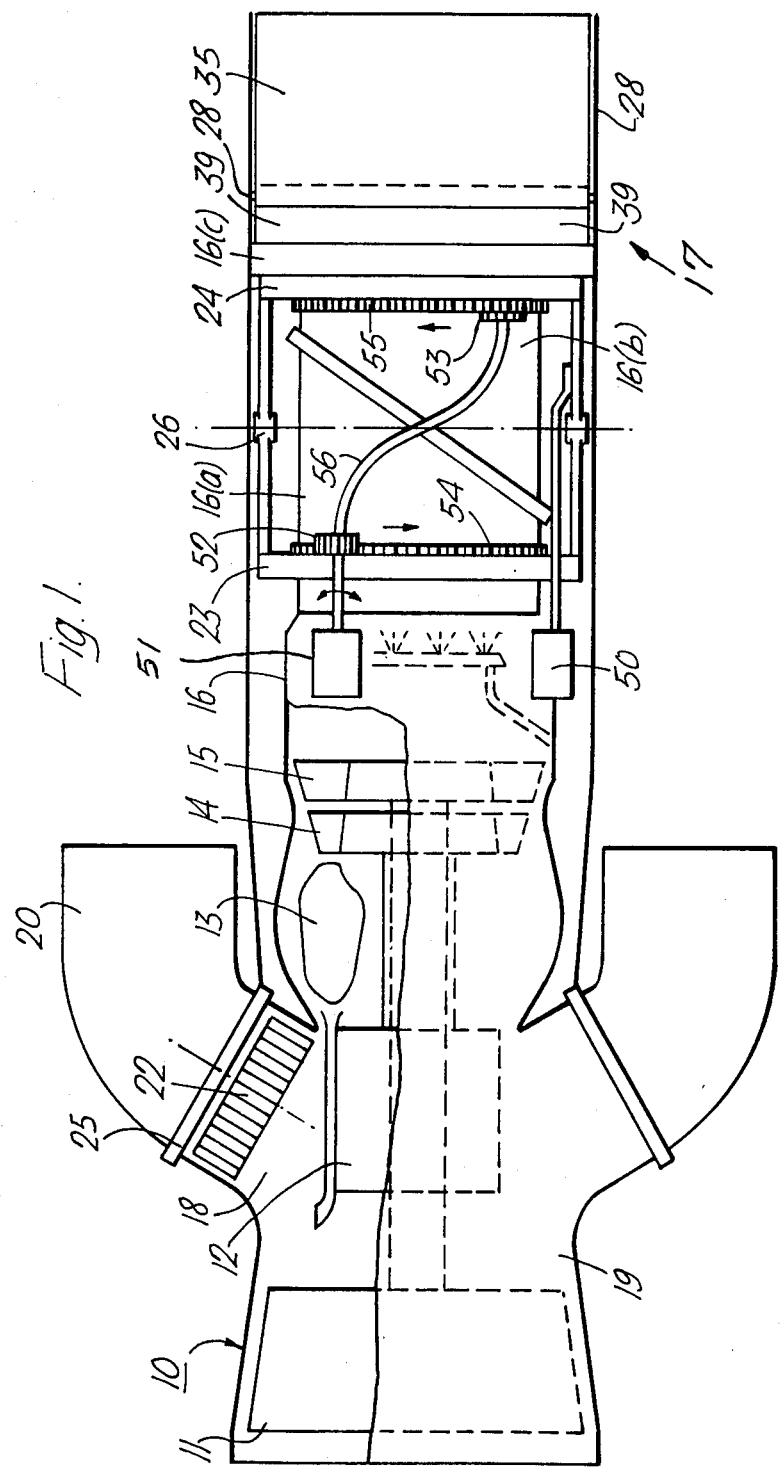
FIG. 1 illustrates schematically a gas turbine aero engine incorporating three vectorable nozzles, for convenience only one of the nozzles is shown constructed in accordance with the present invention.

Referring to FIG. 1 there is shown schematically a gas turbine aero engine 10 of the by-pass type. The engine comprises in flow series, an axial flow low pressure compressor 11, an axial flow high pressure compressor 12, a combustion chamber 13, a high pressure turbine 14 which drives the H.P. compressor 12, a low pressure turbine 15 which drives the L.P. compressor 11, and a jet pipe 16 terminating in a vectorable variable area nozzle 17.

The L.P. compressor 11 supplies compressed air to the H.P. compressor 12 and to a plenum chamber 18 which forms part of the by-pass duct 19 and which terminates in two vectorable nozzles 20. The nozzles 20 are mounted in bearings 25 for rotation through an angle of approximately 110° about an axis 21.

Additional combustion equipment 22 is provided in the plenum chamber 18 so that additional fuel can be burnt in the air stream ejected through the nozzles 20 to increase the thrust. To enable the engine to run efficiently the nozzles 17 and 20 are provided with variable-area, variable-geometry outlets and are constructed in accordance with the present invention.

For convenience the invention will be more particularly described with reference to nozzle 17 but it is to be understood that the mechanism for varying the area and geometry is similar for all the nozzles 17 and 20, and may also be used with nozzles for fixed jet pipes.

The jet pipe 16 is of the type in which a scarfed rotatable duct 16(a) is mounted in bearings 23 on the downstream end of the fixed pipe 16, and a second scarfed duct 16(b) is mounted in bearings 24 for rotation in the opposite direction to that of duct 16(a). The bearing 24 is, in turn, rotatable bodily on trunnions 26 which extend transverse to the axis of duct 16(b). This type of nozzle is described in more detail in co-pending U.S. patent application Ser. No. 376,388, entitled Vectorable Nozzles for Turbomachines, filed Apr. 7, 1982, and naming G. F. Szuminski and Thomas John Jones. In operation, the bearing 24 is rotated about the axis of the trunnions 26 by means of a screw jack (shown schematically by the numeral 50) which pushes on the brackets that support the bearing 24 in the trunnions 26. As the bearing 24 is swung about the axis of the trunnions 26 the ducts 16(a) and 16(b) are rotated in opposite directions by means of a motor 51 and sprockets 52,53 chain drives 54,55 and flexible drive shaft 56 as explained in the above-mentioned U.S. patent application.

The jet pipe 16 has at its downstream end a duct 16(c) which is carried by the fixed race of the bearing. It is this duct 16(c) that is provided with the mechanism for varying the geometry and area of the outlet of the nozzle 17 in accordance with the present invention, as shown in FIGS. 2 to 5.

Figure 4:
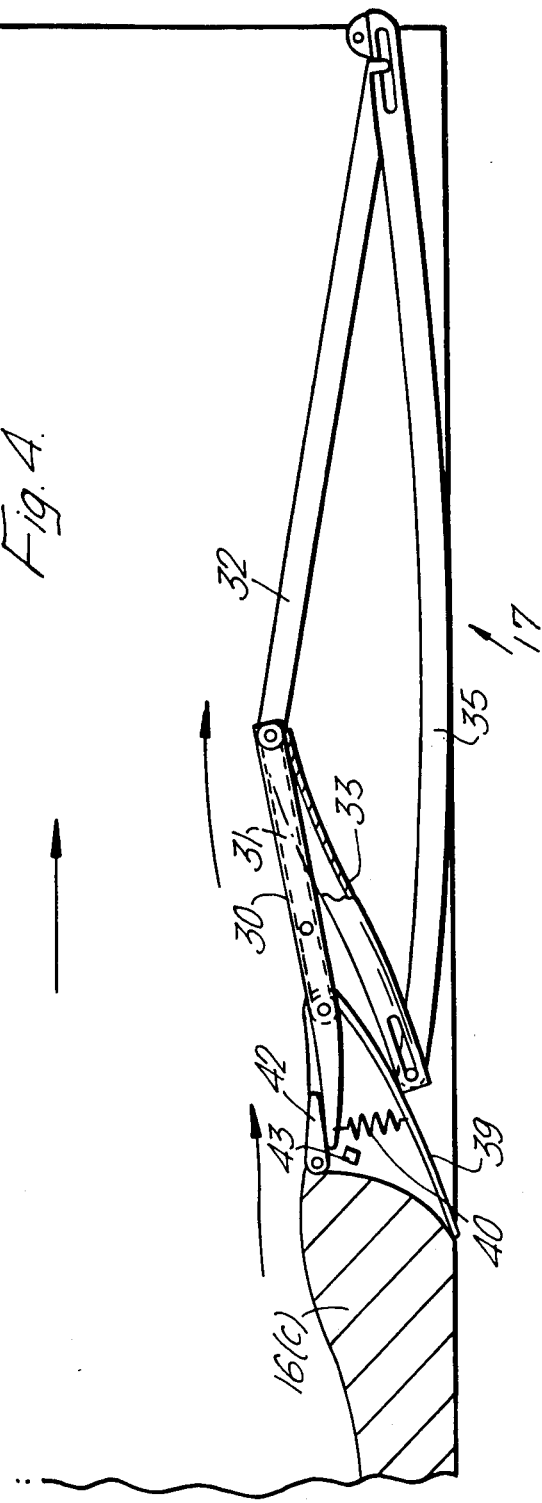

Referring to FIGS. 2 to 4 the jet pipe 16(c) is provided with two side walls 28 that extend downstream of the end of the jet pipe. The jet pipe 16(c) downstream end is of substantially rectangular cross-sectional shape and is provided with air outlet openings 29 in the upper and lower walls defining the jet pipe. The mechanism for varying the geometry and area of the inlet nozzle comprises a pair of first flaps 30 each of which is mounted to pivot about the axis extending transverse to the jet pipe 16(c) about a region intermediate the upstream and downstream ends of each flap 30, such that the loads on the flap are at least partially balanced to minimize the actuation loads. The flaps 30 extend between the side walls 28 and a seal means (not shown) is provided between the flaps 30 and the side walls 28. The flaps 30 are of generally corrugated form and are constructed with slots 30(a) extending from their pivotal axis to their downstream end to leave channel shaped fingers 30(b), as shown in FIG. 7.

A plurality of links 31 is provided. The links 31 are pivotally mounted on the jet pipe 16(c) to rotate about the same axis as the flaps 30. A pair of second flaps 32 is pivotally attached at their upstream end to the free end of each link 31. The links 31 also carry corrugated fairing flaps 33 which are pivotally attached at their downstream end to the free end of each link 31 and are provided with a slot 34 at its upstream end. A fourth flap 35 is pivotally attached at its upstream end to the upstream end of each flap 33. Each fourth flap 35 is pivotally connected at its downstream end to the downstream end of each second flap 32.

Figure 5:
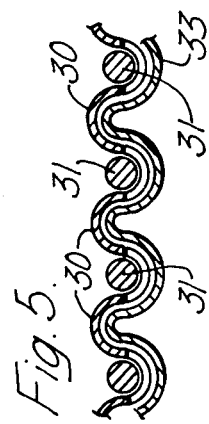
FIG. 5 illustrates a cross-sectional view through the flaps 30, 33 and links 31 of the nozzle shown in FIGS. 1 to 4.

Referring to FIG. 5 it will be seen that each flap 30 is carried with the peaks and valleys of the corrugations extending in a axial direction. The corrugations of the flaps 33 match those of flaps 30 so that they can nestle one within the other and the links 31 are positioned relative to flaps 30 and 33 so that they, in turn, nestle in the valleys of the corrugation in the flaps 30 and 33.

Referring to FIGS. 8 and 9, screw jacks 57 are provided to rotate the flaps 30 about their pivotal axis and to rotate the links 31 about their point of pivotal attachment to the jet pipe 16(c), and to rotate flaps 32 about the end of links 31.

Actuators 44 are attached to the upstream pivotal axis of flaps 33 and 35 and are provided to move the upstream end of the said flaps bodily outwards when it is required to form an air inlet scoop for ejector operation. Links 45 connect actuators 44 to levers 46 such that when the said actuators are extended, flaps 30 are rotated independently of links 31. A slot is provided in link 45 to allow for rotation of the lever 46 when actuator 44 is not extended so that the flaps 30 and links 31 are held together by gas pressure forces in all configurations except when actuators 44 are extended. A motor 58 is provided to control the divergence of flaps 32 at any position of actuators 57. The motor 58 is connected to the common pivot of links 47 and 48 by links 49 so that the overall length between the inner pivot of link 48 and the outer pivot of link 47 can be varied thus controlling said divergence.

In operation, to obtain a convergent-parallel configuration of nozzle, (as shown in FIG. 2) as would be required in a dry cruise mode, the flaps 30 are positioned to define the desired throat area. To accomplish this, the links 31 are rotated so that their downstream ends lie adjacent the downstream end of the flaps 30, (which are forcibly held in contact with the links by virtue of the gas load acting upon them), and are positioned to define the desired throat area. This positions the flaps 32 so that they effectively define a continuation of the profile determined by the flaps 30. In this position the flaps 33 and links 31 nestle in the corrugations as shown in FIG. 5 and the links 31 effectively close off the slots 30(a) between the fingers 30(b) of the flaps 30. The downstream end of the flaps 35 are pulled inwardly to form a suitable boat tail angle to reduce base drag. The upstream end of flaps 35 slide in the slots 34 that are provided in the flaps 33, and their downstream ends are constrained by being linked to the master actuators 57 by links 47 and 48 as shown in FIG. 8, to prevent the flaps 32, 33 and 35 rotating about the end of links 31.

For thrust reverse the links 31 and flaps 32, 33 and 35 are rotated forwards from their dry mode setting as shown in FIG. 2 to obturate the flow path through the nozzle and uncover the air outlet openings. The thrust reverse position is shown dotted in FIG. 2. The upstream ends of flaps 33 and 35 lie alongside the openings 29 but do not cover them.

Fairing flaps 39 are provided to close-off the outer extremity of the air outlets 29. The flaps 39 are mounted on the same pivots as flaps 30 and are connected to the upstream ends of flaps 30 by means of tension springs 40. On the inboard side of outlets 29 flaps 42 are provided which co-operate with the upstream ends of the flaps 30. Stops 43 are provided to limit the outward movement of the flaps 42.

Referring to FIGS. 3 and 9 the nozzle is shown with the flaps 30, 33, 32, 35 in the dry ejector nozzle position. The flaps 30 are rotated from the dry mode position forwards by the outward movement of links 45 by extension of actuators 44, to define a convergent throat for the nozzle of an appropriate area. The area of the throat being that of the slots in flaps 30 and the area between the downstream ends of the fingers of the flaps 30. In this position, the flaps 30 obturate the air outlet openings 29. The links 31 are simultaneously rotated to move the flaps 32, 33 and 35 bodily outwards to a position where the flaps 33 form an air inlet scoop 38 on the downstream side of the flaps 30. The flaps 32, serve to define a parallel or slightly diverging part of the nozzle of appropriate area to cope with the increased volume of air flowing through the nozzle. Cold air entering the scoop 38 mixed downstream of flaps 30 with the hot gases flowing through the slots in flaps 30 and over the tips of the fingers. The cold air cools and shields the hot gas plume and thereby reduces the infra red emission of the engine exhaust gases.

Referring to FIG. 4 a reheat mode is obtained by rotating the flaps 30 to a position where they obturate the air outlet openings 29 and define, with the flaps 33, the appropriate throat area. The links 31 are rotated to swing the flaps 32, 33 and 35 bodily inwards until the upstream ends of the flaps 33 contact the air intake fairing flaps. Further rotation of the links 31 pulls the upstream edges of the flaps 32 to a position adjacent the downstream ends of flaps 30 and the links 31 close off the slots in flaps 30 and thereby define a convergent-divergent nozzle.

For supersonic dry cruise, where a convergent-divergent configuration is required the flaps 30 are rotated to define the appropriate area throat for the dry mode the links 31 are rotated, and the actuators 58 are operated to pull the flaps 32 to a divergent configuration downstream of the convergent throat.

The slots 34 could be provided at the downstream ends of the second and third flaps 32, 35 instead of the upstream ends of flaps 33, 35.

Referring to FIGS. 11 and 12, the first flaps 30 and links 31 could be tapered instead of rectangular, the direction of the taper of the flaps being opposite to that of the links so that the latter seal against the former when in the nozzle configuration shown in FIGS. 2 and 4, the links 31 would be capable of being rotated around their longitudinal axes, such rotation being accomplished when said flaps are being moved independently of said links. When the nozzle is in the configuration shown in FIG. 3, the links have been rotated to the position shown in FIG. 12 so that they present minimal obstruction to the airflow. The rotation of the said links could be achieved by means of gearing such that when flaps 30 are rotated about their pivots independently of links 31, the links are caused to rotate around their own axes.

The flaps 42 with springs 40 and stops 43 could be deleted if the air outlet end wall is shaped to conform closely to the locus of the movement of the upstream end of flaps 30, as shown by the dotted line on FIG. 2. The flap would be provided with a suitable seal to prevent escape of exhaust gas between the flap and the wall except when thrust reversal is required.

I claim:

1. An ejector nozzle for a gas turbine aero engine comprising: a duct; a pair of mutually confronting sidewalls extending downstream of the duct; one or more air outlet openings at the downstream end of the duct; a pair of first flaps extending between the sidewalls, each first flap being pivotally mounted downstream of the openings, for rotation about an axis which extends transverse to the duct, which axis passes through a region of the flap intermediate its upstream and downstream ends, and each of the first flaps being provided with slots in that portion between its pivotal axis and its downstream end; a plurality of links each of which is pivotally mounted at one end on structure which is fixed relative to the duct so as to rotate about an axis transverse to the duct; a pair of second flaps which extend between the sidewalls, each second flap being pivotally connected at an upstream end to the free end of one or more links; a pair of third flaps extending between the side walls, each third flap being pivotally attached at its downstream end to the upstream end of one of the second flaps; a pair of fourth flaps extending between the side walls, each fourth flap being pivotally attached at its upstream end to the upstream end of one of the third flaps, and pivotally attached at its downstream end to the downstream end of one of the second flaps; and actuation means operable to rotate the first flaps about their axes of pivotal movement to and from a first position where the first flaps obturate the said outlet openings and define a boundary wall of gas flow path through the nozzle, to and from a second position where they co-operate with the third flaps to define a convergent part of the nozzle, and to and from a third position where they uncover the openings and co-operate with the third flaps obturate the duct and constitute deflecting surfaces which redirect gases flowing through the nozzle out through the outlet openings, the actuation means being operable to rotate the links and swing the second, third, and fourth flaps bodily about the axes of pivotal attachment of the links to the said structure thereby, in at least one position of the links, to define an air intake opening on the downstream outer side of the first flaps and, in at least a second position of the links, to close off the air intake, cause the third flaps to co-operate with the first flaps to define a convergent part of the nozzle and cause the second flaps to define a divergent part of the nozzle immediately downstream of the first and third flaps.

2. An ejector nozzle according to claim 1 wherein the structure on which the links are pivotally mounted is constituted by the duct.

3. An ejector nozzle according to claim 1 wherein the upstream ends of the fourth flaps are mounted to slide in an axial direction relative to the upstream end of the third flaps.

4. An ejector nozzle according to claim 1 wherein each first flap is of corrugated form the slots define channel shaped fingers, the third flaps are of a complementary corrugated form so that in at least one position of the first and third flaps they nestle, and the links are located and dimensioned to nestle in a valley of the corrugations.

5. An ejector nozzle according to claim 1 wherein a constraining means is provided to constrain the second, third, and fourth flaps to adopt a predetermined attitude when the links are rotated to move the second, third, and fourth flaps bodily.

6. An ejector nozzle according to claim 5 wherein the constraining means is an actuator connected to the downstream ends of the second and fourth flaps.

7. An ejector nozzle according to claim 1 wherein the downstream ends of the fourth flaps are mounted to slide in an axial direction relative to the downstream end of the second flaps.

8. An ejector nozzle according to claim 1 wherein the downstream ends of the fourth flaps are linked, or mounted to slide in an axial direction relative to the downstream end of the second flaps.

* * * * *